(12) United States Patent
Kim et al.

(10) Patent No.: US 12,017,432 B2
(45) Date of Patent: Jun. 25, 2024

(54) DOUBLE-SIDED ADHESIVE TAPE FOR DISPLAY AND MANUFACTURING METHOD THEREFOR

(71) Applicant: LG Chem, Ltd., Seoul (KR)

(72) Inventors: Ji-Hye Kim, Gyeonggi-do (KR);
Hong-June Choi, Gyeonggi-do (KR);
Joon-Seung Lee, Ulsan (KR);
Jang-Soon Kim, Gyeonggi-do (KR);
Woo-Joo Han, Seoul (KR); Ki-Seung Seo, Gyeonggi-do (KR)

(73) Assignee: LG Hausys, Ltd., Seoul (KR)

( * ) Notice: Subject to any disclaimer, the term of this patent is extended or adjusted under 35 U.S.C. 154(b) by 260 days.

(21) Appl. No.: 15/568,299

(22) PCT Filed: Mar. 22, 2016

(86) PCT No.: PCT/KR2016/002878
§ 371 (c)(1),
(2) Date: Oct. 20, 2017

(87) PCT Pub. No.: WO2017/014402
PCT Pub. Date: Jan. 26, 2017

(65) Prior Publication Data
US 2018/0117885 A1    May 3, 2018

(30) Foreign Application Priority Data
Jul. 23, 2015 (KR) .......... 10-2015-0104377

(51) Int. Cl.
*B32B 27/06* (2006.01)
*B32B 7/12* (2006.01)
(Continued)

(52) U.S. Cl.
CPC .............. *B32B 27/065* (2013.01); *B32B 7/12* (2013.01); *C09J 7/20* (2018.01); *C09J 7/29* (2018.01);
(Continued)

(58) Field of Classification Search
None
See application file for complete search history.

(56) References Cited

U.S. PATENT DOCUMENTS

2007/0196647 A1    8/2007   Yokoyama et al.
2008/0160242 A1    7/2008   Choi
(Continued)

FOREIGN PATENT DOCUMENTS

CN    101024756 A    8/2007
CN    101636460 A    1/2010
(Continued)

OTHER PUBLICATIONS

JP 2013-072074 English Machine Translation.*
(Continued)

*Primary Examiner* — Alicia Chevalier
*Assistant Examiner* — Elaine M Vazquez
(74) *Attorney, Agent, or Firm* — Lerner David LLP

(57) ABSTRACT

Provided are a double-sided adhesive tape for a display and a manufacturing method therefor, the double-sided adhesive tape sequentially including: a first acrylic adhesive layer; an acrylic foaming layer; a thermoplastic film layer having a black layer laminated on at least one surface thereof; and a second acrylic adhesive layer.

13 Claims, 1 Drawing Sheet

(51) Int. Cl.
*C09J 7/20* (2018.01)
*C09J 7/29* (2018.01)

(52) U.S. Cl.
CPC ..... *B32B 2457/20* (2013.01); *C09J 2203/318* (2013.01); *C09J 2301/124* (2020.08); *C09J 2400/243* (2013.01); *C09J 2433/00* (2013.01); *C09J 2433/006* (2013.01); *G02F 2201/46* (2013.01)

(56) References Cited

U.S. PATENT DOCUMENTS

| | | | |
|---|---|---|---|
| 2015/0132558 | A1 | 5/2015 | Iwasaki et al. |
| 2015/0136317 | A1* | 5/2015 | Yamada ............. B29C 65/5057 156/272.8 |
| 2016/0068715 | A1 | 3/2016 | Kim et al. |
| 2016/0264827 | A1 | 9/2016 | Lee et al. |
| 2017/0292002 | A1* | 10/2017 | Matsuki ................. B32B 27/32 |

FOREIGN PATENT DOCUMENTS

| | | |
|---|---|---|
| CN | 104321398 A | 1/2015 |
| CN | 104449443 A | 3/2015 |
| EP | 2141211 A2 * | 1/2010 ............... B32B 5/18 |
| JP | 2007246881 A | 9/2007 |
| JP | 2007254711 A | 10/2007 |
| JP | 2009040901 A | 2/2009 |
| JP | 2009084364 A | 4/2009 |
| JP | 2010013648 A | 1/2010 |
| JP | 2013072074 A * | 4/2013 |
| KR | 20080060544 A | 7/2008 |
| KR | 20140133630 A | 11/2014 |
| KR | 10-1471361 B1 | 12/2014 |
| KR | 20150032464 A | 3/2015 |
| KR | 20150060085 A | 6/2015 |
| TW | 201443195 A | 11/2014 |
| WO | 2014181976 A1 | 11/2014 |
| WO | 2015077738 A1 | 5/2015 |

OTHER PUBLICATIONS

EP-2141211 English Machine Translation.*
Search Report from International Application No. PCT/KR2016/002878, mailed May 23, 2016.
Taiwanese Search Report for Application No. 105108897 dated Jun. 5, 2018, 1 page.
Chinese Search Report for Application No. 201680022936.1 dated Jun. 3, 2020, 1 page.

* cited by examiner

DOUBLE-SIDED ADHESIVE TAPE FOR DISPLAY AND MANUFACTURING METHOD THEREFOR

CROSS-REFERENCE TO RELATED APPLICATION

This application is a national phase entry under 35 U.S.C. § 371 of International Application No. PCT/KR2016/002878, filed Mar. 22, 2016, which claims priority to Korean Patent Application No. 10-2015-0104377, filed Jul. 23, 2015, the disclosures of which are incorporated herein by reference.

TECHNICAL FIELD

The present invention relates to a double-sided adhesive tape for a display and a manufacturing method therefor.

BACKGROUND ART

In general, in a display device, a double-sided adhesive tape has been used in order to bond and fix various types of display panels, electronic parts, and the like. For example, a double-sided adhesive tape is interposed between a display window and a display assembly and may serve to bond the display window and the display assembly, and as described above, the double-sided adhesive tape may serve to prevent external impurities and the like from infiltrating into an edge of a display, and the like while fixing the edge of the display, and the like, and also to prevent light irradiated from a light source, and the like mounted at the rear of a liquid crystal panel, and the like from leaking out from the edge of the display.

The double-sided adhesive tape has a structure including an adhesive layer on both surfaces of a foaming layer, and as an example of the foaming layer, a polyurethane-based foaming layer, an acrylic foaming layer, and the like have been used and impact resistance may be secured to some extent by including a foaming layer, but there is a problem in that tensile strength or dimensional stability is not sufficient.

In addition, the double-sided adhesive tape typically includes a foaming layer, an adhesive layer, or a black colorant in both the forming layer and the adhesive layer in order to prevent light irradiated from a light source, and the like mounted at the rear of a liquid crystal panel and the like from leaking out, and for this reason, the black colorant absorbs UV irradiated during the process of forming a foaming layer, so that photo curing does not sufficiently occur or an irradiation dose needs to be increased, and as a result, the efficiency of a photo curing reaction is too low, and an adhesive property of the adhesive layer may deteriorate.

DETAILED DESCRIPTION OF THE INVENTION

Technical Problem

An exemplary embodiment of the present invention provides a double-sided adhesive tape for a display, which simultaneously implements excellent impact resistance, excellent dimensional stability, and an excellent adhesive property.

Another exemplary embodiment of the present invention provides a method for manufacturing the double-sided adhesive tape for a display.

However, a technical problem to be achieved by the present invention is not limited to the aforementioned problem, and the other problems that are not mentioned may be clearly understood by the person skilled in the art from the following description.

Technical Solution

An exemplary embodiment of the present invention provides a double-sided adhesive tape for a display, sequentially including: a first acrylic adhesive layer; an acrylic foaming layer; a thermoplastic film layer having a black layer laminated on at least one surface thereof; and a second acrylic adhesive layer.

Further, another exemplary embodiment of the present invention provides a method for manufacturing a double-sided adhesive tape for a display, the method including: forming a black layer on at least one surface of a thermoplastic film layer; forming an acrylic foaming layer; forming a laminate by laminating the thermoplastic film layer having the black layer formed on at least one surface thereof and the acrylic foaming layer; and manufacturing a double-sided adhesive tape for a display by forming acrylic adhesive layers on both surfaces of the laminate.

The double-sided adhesive tape for a display may maintain excellent impact resistance by including an acrylic foaming layer, and may further improve tensile strength of the double-sided adhesive tape by additionally including a thermoplastic film layer, and thus has an advantage in that excellent dimensional stability may be implemented.

Simultaneously, by forming the black layer on one surface or both surfaces of the thermoplastic film layer, it is possible to effectively prevent light irradiated from a light source, and the like mounted at the rear of a liquid crystal panel, and the like from leaking out without a problem in that the efficiency of a photo curing reaction is decreased and a problem in that the adhesive property of the adhesive layer deteriorates when the foaming layer is formed.

Since the thermoplastic film layer may have the black layer laminated on one surface or both surfaces thereof, and accordingly, the interface bonding strength between the respective layers may be effectively improved, it is possible to implement excellent long-term durability while improving overall physical properties of the double-sided adhesive tape for a display.

Each of the first acrylic adhesive layer, the acrylic foaming layer, and the second acrylic adhesive layer may not include any separate colorant, and accordingly, impact resistance of the acrylic foaming layer may be further improved by improving the efficiency of a photo curing reaction, and simultaneously, the adhesive strength may be implemented at an excellent level because adhesive properties of the first and second acrylic adhesive layers do not deteriorate.

Advantageous Effects

The double-sided tape for a display has an advantage in that it is possible to simultaneously implement excellent impact resistance, excellent dimensional stability, and an excellent adhesive property.

BEST MODE

Figure 1:
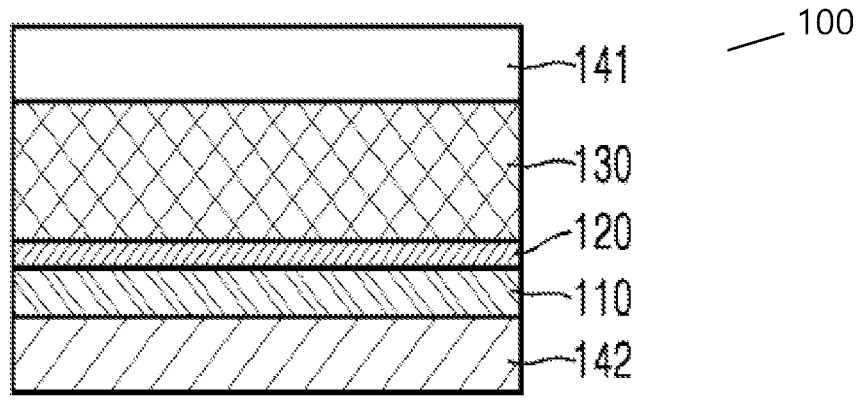
FIG. 1 is a schematic cross-sectional view of a double-sided adhesive tape for a display according to an exemplary embodiment of the present invention.

Hereinafter, exemplary embodiments of the present invention will be described in detail with reference to the accompanying drawings so that a person with ordinary skill in the art to which the present invention pertains can easily carry out the present invention. The present invention can be implemented in various forms, and is not limited to the exemplary embodiments described herein.

To clearly describe the present invention, parts irrelevant to the description are omitted, and the same reference numerals will be given to the same or similar constituent elements throughout the specification.

In the drawings, the thicknesses of several layers and regions are enlarged so as to clearly express the layers and the regions. Moreover, in the drawings, the thicknesses of some layers and regions are exaggerated for convenience of explanation.

Hereinafter, the formation of any configuration at an upper portion (or a lower portion) of a base material or on (or below) of the base material means that any configuration is formed to be brought into contact with an upper surface (or a lower surface) of the base material, and is not limited to a case where another configuration is not included between the base material and any configuration formed on (or below) the base material.

FIG. 1 schematically illustrates the cross-section of a double-sided adhesive tape 100 for a display according to an exemplary embodiment of the present invention.

The double-sided adhesive tape 100 for a display may sequentially include: a first acrylic adhesive layer 141; an acrylic foaming layer 130; a thermoplastic film layer 110 having a black layer 120 laminated on at least one surface thereof; and a second acrylic adhesive layer.

In general, the double-sided adhesive tape has a structure including an adhesive layer on surfaces of a foaming layer, and as an example of the foaming layer, a polyurethane-based foaming layer, an acrylic foaming layer, and the like have been used and impact resistance may be secured to some extent by including a foaming layer, but there is a problem in that tensile strength or dimensional stability is not sufficient.

In addition, the double-sided adhesive tape typically includes a foaming layer, an adhesive layer, or a black colorant in both the forming layer and the adhesive layer in order to prevent light irradiated from a light source, and the like mounted at the rear of a liquid crystal panel and the like from leaking out, and as described above, when the black colorant is included in the foaming layer, the black colorant absorbs UV irradiated during the process of forming the foaming layer, so that photo curing does not sufficiently occur or the irradiation dose needs to be increased, and as a result, the efficiency of a photo curing reaction becomes too low, and when the black colorant is included in the adhesive layer, an adhesive property of the adhesive layer may deteriorate.

Thus, an exemplary embodiment of the present invention has an advantage in that it is possible to implement excellent dimensional stability by including the acrylic foaming layer 130 to maintain excellent impact resistance and additionally including the thermoplastic film layer 110 to further improve tensile strength of the double-side adhesive tape 100.

Simultaneously, by forming the black layer 120 on one surface or both surfaces of the thermoplastic film layer 110, it is possible to effectively prevent light irradiated from a light source, and the like mounted at the rear of a liquid crystal panel, and the like from leaking out without a problem in that the efficiency of a photo curing reaction is decreased and a problem in that an adhesive property of the adhesive layer deteriorates when the foaming layer is formed.

The thermoplastic film layer 110 may include at least one selected from the group consisting of, for example, polyethylene, polypropylene, polyurethane, polyethylene terephthalate, polybutylene terephthalate, polyurea, polyvinyl chloride, polyvinyl acetate, ethylene vinyl acetate, polyphenylene sulfide, polyamide, polyimide, polybenzimidazole, polyether ether ketone, and a combination thereof, but specifically, may implement excellent dimensional stability by including polyethylene terephthalate.

The thermoplastic film layer may have a thickness of about 4 μm to about 150 μm. By having a thickness within the range, the thermoplastic film layer 110 may implement sufficient dimensional stability without excessively increasing the total thickness of the double-sided adhesive tape 100 for a display.

The black layer 120 may be laminated on one surface or both surfaces of the thermoplastic film layer, and specifically, may be laminated on both surfaces of the thermoplastic film layer.

The interface bonding strength between the acrylic foaming layer 130 and the thermoplastic film layer is lower than the interface bonding strength between the acrylic foaming layer 130 and the black layer 120, and the interface bonding strength between the second acrylic adhesive layer and the thermoplastic film layer is lower than the interface bonding strength between the second acrylic adhesive layer and the black layer 120.

Accordingly, since it is possible to effectively improve the interface bonding strength between the respective layers by laminating the black layer 120 on one surface or both surfaces of the thermoplastic film layer, and specifically, both surfaces thereof, it is possible to implement excellent long-term durability while improving overall physical properties of the double-sided adhesive tape 100 for a display.

The black layer 120 may be formed, for example, by applying and drying a black composition including a black colorant on at least one surface of the thermoplastic film layer.

A method for applying the black composition may use any one method selected from, for example, a die coating method, a gravure coating method, a knife coating method, a bar coating method, a spray coating method, or a screen printing method, but is not limited thereto.

The black colorant may include at least one selected from the group consisting of, for example, a carbon black-based colorant, a graphite-based colorant, an iron oxide-based colorant, an anthraquinone-based colorant, a cobalt oxide-based colorant, a copper oxide-based colorant, a manganese-based colorant, an antimony oxide-based colorant, a nickel oxide-based colorant, and a combination thereof.

Specific examples thereof include C.I. Pigment Blacks 6, 7, 9, and the like, C.I. Pigment Blacks 8, 10, and the like, C.I. Pigment Blacks 11, 12, and 27, iron oxide of KN-370 manufactured by Toda Kogyo Corp. such as Pigment Brown 35, Titanium Black 13M manufactured by Mitsubishi Materials Corporation, C.I. Pigment Black 20, C.I. Pigment Blacks 13, 25, and the like, C.I. Pigment Blacks 15, 28, and the like, C.I. Pigment Black 14, and the like, C.I. Pigment Black 23, and the like.

The black composition may further include a binder resin, and for example, the binder resin may include at least one selected from the group consisting of a polyurethane-based resin, a polyester-based resin, a polyacrylate-based resin, a polymethacrylate-based resin, a polyisoprene-based resin, polysilicone, and a combination thereof, but is not limited thereto.

The black composition may include the black colorant in an amount of about 30 parts by weight to about 150 parts by weight based on about 100 parts by weight of the binder resin.

Further, the black composition may further include a solvent, a dispersing agent, or both the solvent and the dispersing agent.

The solvent may include at least one selected from the group consisting of, for example, an ester-based compound, an aromatic hydrocarbon-based compound, an ether-based compound, a ketone-based compound, and a combination thereof, and specifically, may include at least one selected from the group consisting of n-propyl acetate and n-butyl acetate, benzene, toluene, xylene, dibutyl ether, isopropyl ether, dioxane, tetrahydrofuran, acetone, diethyl ketone, methyl ethyl ketone, methyl isobutyl ketone, methyl propyl ketone, cyclohexanone, and a combination thereof, but is not limited thereto.

The solvent may be evaporated during the process of forming the black layer 120 by applying and drying the black composition, and accordingly, a relative content of the black colorant, for example, wt % of the black colorant may be different in the black composition and the black layer 120.

The black layer 120 may include the black colorant in an amount of, for example, about 10 wt % to about 80 wt %, and specifically, about 40 wt % to about 80 wt %.

By including the black colorant in a content within the range, it is possible to implement excellent coatability while sufficiently preventing light irradiated from a light source and the like mounted at the rear of a liquid crystal panel, and the like from leaking out.

The black layer 120 may have a thickness of about 0.1 μm to about 5 μm, and the black layer 120 may have a light transmittance of, for example, about 4.0% or less, specifically, 0% to about 3.0%.

By having a thickness within the range, it is possible to implement an excellent interface bonding strength between the acrylic foaming layer 130 or the second acrylic adhesive layer and the black layer, and it is possible to sufficiently prevent light irradiated from a light source, and the like mounted at the rear of a liquid crystal panel, and the like from leaking out. Simultaneously, it is possible to effectively prevent light irradiated from a light source, and the like mounted at the rear of a liquid crystal panel, and the like from leaking out by having a light transmittance within the range.

In an exemplary embodiment, each of the first acrylic adhesive layer 141, the acrylic foaming layer 130, and the second acrylic adhesive layer 142 may not include any separate colorant.

As described above, the first and second acrylic adhesive layers 141 and 142 and the acrylic foaming layer 130 may include no black colorant by forming the black layer 120 as a separate layer on one surface or both surfaces of the thermoplastic film, and accordingly, impact resistance of the acrylic foaming layer 130 may be further improved by improving the efficiency of a photo curing reaction, and simultaneously, the adhesive strength may be implemented at an excellent level because adhesive properties of the first and second acrylic adhesive layers 141 and 142 do not deteriorate.

In an exemplary embodiment, the acrylic foaming layer 130 may be formed by carrying out any one of UV irradiation and heat treatment or sequentially carrying out both UV irradiation and heat treatment on a foaming composition; or may be formed by carrying out UV irradiation on a foaming composition while injecting a gas thereto. A UV curing reaction may be carried out by the UV irradiation, and a thermal curing reaction may be carried out by the heat treatment.

For example, the acrylic foaming layer 130 may be formed by carrying out any one of UV irradiation and heat treatment or sequentially carrying out both UV irradiation and heat treatment on a foaming composition including an acrylic polymer and a pore-forming filler; or may be formed by carrying out UV irradiation on a foaming composition, which includes an acrylic polymer but does not include any pore-forming filler, while injecting a gas thereto.

When the acrylic foaming layer 130 is formed, the UV irradiation may be carried out at a UV dose of, for example, about 500 mJ/cm$^2$ to about 2,500 mJ/cm$^2$, and specifically, about 500 mJ/cm$^2$ to about 2,000 mJ/cm$^2$.

Since the acrylic foaming layer 130 includes no colorant as described above, UV is not consumed for that reason, and accordingly, the efficiency of a photo curing reaction may be improved because the photo curing reaction may be effectively carried out even at a small dose.

Further, the heat treatment may be carried out, for example, at about 30° C. to about 60° C. for about 24 hours to about 48 hours, but the temperature and the time are not limited thereto.

The acrylic polymer is formed by polymerizing a co-polymerizable monomer component including an alkyl (meth)acrylate-based monomer and a polar functional group-containing monomer, and a weight ratio of the alkyl (meth)acrylate-based monomer to the polar functional group-containing monomer, which form the acrylic polymer, may be about 30:1 to about 9:1.

By having a weight ratio within the range, the acrylic polymer may have an appropriate flexibility at room temperature, and accordingly, a foaming composition including the acrylic polymer may effectively improve impact resistance by implementing excellent attaching strength and wetting properties.

The alkyl (meth)acrylate-based monomer means a (meth)acrylate-based monomer containing an alkyl group, the alkyl group may include at least one selected from the group consisting of a straight alkyl group, an alicyclic alkyl group, an aromatic alkyl group, or a combination thereof, and the alkyl group may include, for example, butyl acrylate, butyl methacrylate, hexyl acrylate, hexyl methacrylate, n-octyl acrylate, n-octyl methacrylate, isooctyl acrylate, isooctyl methacrylate, 2-ethylhexyl acrylate, 2-ethylhexyl methacrylate, isononyl acrylate, isononyl methacrylate, and the like, but the example is not limited thereto.

The polar functional group-containing monomer may include at least one selected from the group consisting of, for example, a hydroxy group-containing monomer, a carboxyl group-containing monomer, a nitrogen-containing monomer, and a combination thereof, and examples thereof include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate or 2-hydroxypropylene glycol (meth)acrylate, (meth)acrylic acid, 2-(meth)acryloyloxy acetic acid, 3-(meth)acryloyloxy propyl acid, 4-(meth)acryloyloxy butyric acid, acrylic acid dimer, itaconic acid, maleic acid and maleic anhydride, (meth)acrylamide, N-vinylpyrrolidone or N-vinyl caprolactam, but are not limited thereto.

The acrylic polymer may have a viscosity of about 2,000 cps to about 30,000 cps at about 25° C. By having a viscosity within the range, the foaming composition may implement excellent coatability, and as a result, the acrylic foaming layer 130 may be formed at a more uniform level.

The pore-forming filler may be included in an amount of about 0.1 part by weight to about 10 parts by weight based on 100 parts by weight of the acrylic polymer, and the gas may be injected at a flow rate of about 0.001 cubic feet per minute (CFM) to about 0.05 CFM. By including the filler in a content within the range or injecting the gas at a flow rate within the range, the porosity of the acrylic foaming layer 130 is appropriately adjusted, and as a result, it is possible to implement the weight reduction while implementing excellent impact resistance.

The pore-forming filler may include at least one selected from the group consisting of, for example, a hollow polymeric microsphere, a glass bubble, a glass macro balloon, and a combination thereof.

The pore-forming filler may have an average particle diameter of, for example, about 1 μm to about 350 μm, and specifically, about 20 μm to about 150 μm.

The pore-forming filler may include foamed particles which are foamed in advance, unfoamed particles which are not foamed, or both the formed particles and the unfoamed particles.

For example, the pore-forming filler may include foamed particles without including unfoamed particles, and accordingly, a separate heat treatment process for foaming unfoamed particles may be omitted when the acrylic foaming layer 130 is formed, so that the acrylic foaming layer 130 may be formed by only UV irradiation process, and the acrylic foaming layer 130 may be easily formed at a very thick level.

When the pore-forming filler includes unfoamed particles, heat needs to be smoothly transferred to the inside of the acrylic foaming layer 130 in order to foam the unfoamed particles, and accordingly, the thickness of the acrylic foaming layer 130 needs to be limited to a predetermined level.

The gas may include at least one selected from the group consisting of, for example, air, nitrogen, argon, helium, neon, and a combination thereof, and the example is not limited thereto. Further, for example, by including nitrogen which is one of the inert gases, it is possible to maintain costs at an appropriate level while preventing an unexpected change in physical properties of the acrylic adhesive composition.

The foaming composition may further include other foaming agents, and the other foaming agents may include, for example, ammonium carbonate, sodium hydrogen carbonate, azodicarbonamide (ADCA), azobisisobutyronitrile (AIBN), dinitroso pentamethylene tetramine (DPT), P-toluenesulfonyl hydrazide (TSH), P,P'-oxybis(benzenesulfonyl hydrazide) (OBSH), and the like.

In addition, the foaming composition may further include at least one additive selected from the group consisting of, for example, a photoinitiator, a thermal initiator, a thermal curing agent, a photo curing agent, a crosslinking agent, a tackifier, a coupling agent, an antistatic agent, an inorganic filler, a UV blocking agent, a surfactant, an antioxidant, a processed oil, and a combination thereof.

The tackifier may include at least one selected from the group consisting of a rosin ester-based tackifier, a rosin-based tackifier, a terpene-based tackifier, a petroleum resin-based tackifier, and a combination thereof, and may be included in an amount of about 10 parts by weight to about 40 parts by weight based on about 100 parts by weight of the acrylic polymer.

The inorganic filler may include at least one selected from the group consisting of aluminum hydroxide, calcium carbonate, aluminum oxide, magnesium oxide, zinc oxide, silicon carbide, aluminum nitride, boron nitride, silicon nitride, and a combination thereof, and may be included in an amount of about 1 part by weight to about 200 parts by weight based on about 100 parts by weight of the acrylic polymer.

The acrylic foaming layer 130 may have an average pore size of about 20 μm to about 200 μm and a porosity of about 1% to about 40%. The porosity may mean vol %.

By having an average pore size and a porosity within the ranges, it is possible to sufficiently satisfy physical properties such as storage modulus and the maximum value of loss tangent, which are required for the double-sided adhesive tape 100 for a display, and accordingly, it is possible to effectively improve impact resistance.

A thickness of the acrylic foaming layer 130 may be about 30 μm to about 1,000 μm, but is not limited thereto.

The first and second acrylic adhesive layers may be formed by an adhesive composition including at least one selected from the group consisting of, for example, a (meth)acrylic monomer, an oligomer, a resin, and a combination thereof, and the adhesive composition may further include a thermal initiator, a photoinitiator, a thermal curing agent, a photo curing agent, a crosslinking agent, a plasticizer, and the like.

The first and second acrylic adhesive layers may be formed, for example, by carrying out a light irradiation, heat treatment, or both the light irradiation and the heat treatment on the adhesive composition. A photo curing reaction may be carried out by the light irradiation, and a thermal curing reaction may be carried out by the heat treatment.

The (meth)acrylic resin may include at least one selected from the group consisting of, for example, a urethane (meth)acrylate resin, a polyester (meth)acrylate resin, an epoxy (meth)acrylate resin, a polyether (meth)acrylate resin, a polybutadiene (meth)acrylate resin, and a combination thereof, but the resin is not limited thereto.

Further, for example, the (meth)acrylic resin may be formed by polymerizing a co-polymerizable monomer component including an alkyl group-containing (meth)acrylate-based monomer and a carboxyl group-containing (meth)acrylate-based monomer, and a weight ratio of the alkyl group-containing (meth)acrylate-based monomer to the carboxyl group-containing (meth)acrylate-based monomer in the co-polymerizable monomer component, which forms the (meth)acrylic resin may be about 1:0.05 to about 1:0.25.

The co-polymerizable monomer component, which forms the (meth)acrylic resin, includes the alkyl group-containing (meth)acrylate-based monomer and the carboxyl group-containing (meth)acrylate-based monomer at a weight ratio within the range, so that the adhesive composition including the (meth)acrylic resin may implement an excellent adhesive strength for a base material having low surface energy, such as a thermoplastic plastic.

Each adhesive strength of the first acrylic adhesive layer 141 and the second acrylic adhesive layer 142 may be, for example, about 2,350 g/in to about 4,000 g/in, and specifically, about 2,500 g/in to about 4,000 g/in. The adhesive strength means an adhesive strength measured for a plastic base material.

As described above, since the first and second acrylic adhesive layers include no colorant, an adhesive property does not deteriorate, and accordingly, the adhesive strength may be implemented at an appropriately high level.

In addition, a thickness of each of the first acrylic adhesive layer 141 and the second acrylic adhesive layer 142 may be about 25 μm to about 100 μm, but is not limited thereto. The thicknesses of the first acrylic adhesive layer 141 and the second acrylic adhesive layer 142 may be different from or the same as each other within the range.

In an exemplary embodiment, a release layer may be further included on a surface opposite to a surface of the second acrylic adhesive layer 142 on which the thermoplastic film layer 110 is laminated, and the release layer may be formed of a coating composition including a release material publicly known in the art, and the release material may include, for example, a polyester-based polymer, silicone, and the like, but is not limited thereto.

A thickness of the release layer may be about 50 μm to about 150 μm, but is not limited thereto.

The double-sided adhesive tape 100 may have a tensile strength of about 100 MPa to about 500 MPa, and an impact strength of about 0.7 mJ to about 2.0 mJ. The tensile strength may be measured in accordance with JIS K 7113 standard.

By having a tensile strength and an impact strength within the ranges, it is possible to effectively improve dimensional stability, and simultaneously, to maintain excellent impact resistance.

Figure 2:
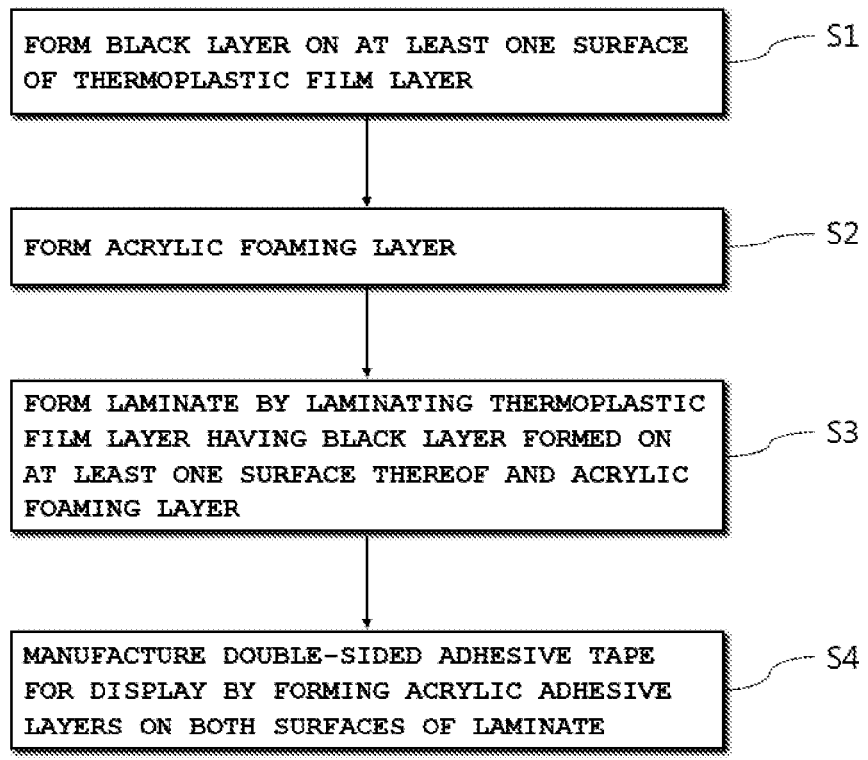
FIG. 2 is a schematic process flow chart of a method for manufacturing a double-sided adhesive tape for a display according to another exemplary embodiment of the present invention.

FIG. 2 schematically illustrates a process flow chart of a method for manufacturing a double-sided adhesive tape for a display according to another exemplary embodiment of the present invention.

The manufacturing method may include: forming a black layer on at least one surface of a thermoplastic film layer (S1); forming an acrylic foaming layer (S2); forming a laminate by laminating the thermoplastic film layer having the black layer formed on at least one surface thereof and the acrylic foaming layer (S3); and manufacturing a double-sided adhesive tape for a display by forming acrylic adhesive layers on both surfaces of the laminate (S4). By the manufacturing method, the double-sided adhesive tape for a display described above in an exemplary embodiment may be manufactured.

In the manufacturing method, the black layer may be formed, for example, by applying and drying a black composition including a black colorant on at least one surface of the thermoplastic film layer. The black composition and the thermoplastic film layer may be the same as those described above in an exemplary embodiment.

A method for applying the black composition may use any one method selected from, for example, a die coating method, a gravure coating method, a knife coating method, a bar coating method, a spray coating method, or a screen printing method, but is not limited thereto.

In the forming of the black layer, the black layer may be formed so as to include the black colorant in an amount of, for example, about 10 wt % to about 80 wt %, and specifically, about 40 wt % to about 80 wt %.

By forming the black layer so as to include the black colorant in a content within the range, it is possible to implement excellent coatability while sufficiently preventing light irradiated from a light source and the like mounted at the rear of a liquid crystal panel, and the like from leaking out.

In the forming of the black layer, the black layer may be formed so as to have a thickness of about 0.1 μm to about 5 μm and a light transmittance of, for example, about 4.0% or less, and specifically, 0% to about 3.0%.

The black layer is formed so as to have a thickness within the range, so that it is possible to implement an excellent interface bonding strength between the acrylic foaming layer or the second acrylic adhesive layer and the black layer, and it is possible to sufficiently prevent light irradiated from a light source, and the like mounted at the rear of a liquid crystal panel, and the like from leaking out. Simultaneously, the black layer is formed so as to have a light transmittance within the range, so that it is possible to effectively prevent light irradiated from a light source, and the like mounted at the rear of a liquid crystal panel, and the like from leaking out.

In the manufacturing method, neither of the acrylic foaming layer and the acrylic adhesive layer may include a separate colorant.

As described above, the first and second acrylic adhesive layers and the acrylic foaming layer may include no black colorant by forming the black layer as a separate layer on one surface or both surfaces of the thermoplastic film layer, and accordingly, impact resistance of the acrylic foaming layer may be further improved by improving the efficiency of a photo curing reaction, and simultaneously, adhesive properties of the first and second acrylic adhesive layers may be further improved.

In the manufacturing method, an acrylic foaming layer may be formed by carrying out any one of UV irradiation and heat treatment or sequentially carrying out both UV irradiation and heat treatment on a foaming composition, or carrying out UV irradiation on the foaming composition while injecting a gas thereto.

For example, the acrylic foaming layer may be formed by carrying out any one of UV irradiation and heat treatment, or sequentially carrying out both UV irradiation and heat treatment on a foaming composition including an acrylic polymer and a pore-forming filler, or carrying out UV irradiation on a foaming composition, which includes an acrylic polymer but does not include any pore-forming filler, while injecting a gas thereto. The foaming composition is the same as that described above in an exemplary embodiment.

That is, when the acrylic foaming layer is formed by using a foaming composition including an acrylic polymer and a pore-forming filler, the acrylic foaming layer may be formed by carrying out UV irradiation, or formed by carrying out heat treatment, or formed by sequentially carrying out UV irradiation and heat treatment.

Furthermore, when the acrylic foaming layer is formed by using a foaming composition including an acrylic polymer and a pore-forming filler, the acrylic foaming layer may be formed by carrying out UV irradiation while injecting a gas thereto.

The acrylic polymer is formed by polymerizing a co-polymerizable monomer component including an alkyl (meth)acrylate-based monomer and a polar functional group-containing monomer, and a weight ratio of the alkyl (meth)acrylate-based monomer to the polar functional group-containing monomer, which form the acrylic polymer, may be about 30:1 to about 9:1.

By having a weight ratio within the range, the acrylic polymer may have an appropriate flexibility at room temperature, and accordingly, a foaming composition including the acrylic polymer may effectively improve impact resistance by implementing excellent attaching strength and wetting properties.

The acrylic polymer may have a viscosity of about 2,000 cps to about 30,000 cps at about 25° C. By having a viscosity within the range, the foaming composition may implement excellent coatability to form the acrylic foaming layer at a more uniform level.

The pore-forming filler may be included in an amount of about 0.1 part by weight to about 10 parts by weight based on 100 parts by weight of the acrylic polymer, and the gas may be injected at a flow rate of about 0.001 cubic feet per minute (CFM) to about 0.05 CFM. By including the filler in a content within the range or injecting the gas at a flow rate within the range, the porosity of the acrylic foaming layer is appropriately adjusted, and as a result, it is possible to implement the weight reduction while implementing excellent impact resistance.

Further, as described above, when the acrylic foaming layer is formed by including the filter for forming pores, or injecting the gas, an aging treatment may be further carried out in both cases, and the aging treatment may be carried out by a method publicly known in the art, and the method is not particularly limited.

In the forming of the acrylic foaming layer, the UV irradiation may be carried out at a UV dose of, for example, about 500 mJ/cm$^2$ to about 2,500 mJ/cm$^2$, and specifically, about 500 mJ/cm$^2$ to about 2,000 mJ/cm$^2$.

Since the acrylic foaming layer includes no colorant as described above, UV is not consumed for that reason, and accordingly, the efficiency of a photo curing reaction may be improved because the photo curing reaction may be effectively carried out even at a small dose.

Further, the heat treatment may be carried out, for example, at about 30° C. to about 60° C. for about 24 hours to about 48 hours, but the temperature and the time are not limited thereto.

In the forming of the acrylic foaming layer, the acrylic foaming layer may be formed so as to have an average pore size of about 20 μm to about 200 μm and a porosity of about 1% to about 40%. The porosity may mean vol %.

By forming the acrylic foaming layer so as to have an average pore size and a porosity within the ranges, it is possible to sufficiently satisfy physical properties such as storage modulus and the maximum value of loss tangent, which are required for a double-sided adhesive tape for a display, and accordingly, it is possible to effectively improve impact resistance.

The acrylic foaming layer may be formed so as to have a thickness of about 30 μm to about 1,000 μm, but the thickness is not limited thereto.

A laminate may be formed by laminating the thermoplastic film layer having the black layer formed on at least one surface thereof and the acrylic foaming layer. The layers may be laminated by a method publicly known in the art, and may be laminated by applying, for example, heat and pressure, but the method is not limited thereto.

A double-sided adhesive tape for a display may be manufactured by forming acrylic adhesive layers on both surfaces of the laminate.

The first and second acrylic adhesive layers may be formed by an adhesive composition including at least one selected from the group consisting of, for example, a (meth) acrylic monomer, an oligomer, a resin, and a combination thereof, and the adhesive composition may further include a thermal initiator, a photoinitiator, a thermal curing agent, a photo curing agent, a crosslinking agent, a plasticizer, and the like. The adhesive composition is the same as that described above in an exemplary embodiment.

For example, the first and second acrylic adhesive layers may be formed by sequentially or simultaneously applying the adhesive composition on both surfaces of the laminate, and then carrying out a light irradiation, heat treatment, or both the light irradiation and the heat treatment, and accordingly, the first and second acrylic adhesive layers may be formed by subjecting the applied adhesive composition to a photo curing reaction, a thermal curing reaction or both the photo curing reaction and the thermal curing reaction. As a method for applying the adhesive composition, the method for applying a black composition, which is described above in an exemplary embodiment, may be used.

Each of the first acrylic adhesive layer and the second acrylic adhesive layer may be formed so as to have an adhesive strength of, for example, about 2,350 g/in to about 4,000 g/in, and specifically, about 2,500 g/in to about 4,000 g/in. The adhesive strength means an adhesive strength measured for a plastic base material.

As described above, since the first and second acrylic adhesive layers include no colorant, an adhesive property does not deteriorate, and accordingly, the adhesive strength may be more effectively improved.

In addition, the first acrylic adhesive layer and the second acrylic adhesive layer may be formed so as to each have a thickness of about 25 μm to about 100 μm, but the thickness is not limited thereto. The thicknesses of the first acrylic adhesive layer and the second acrylic adhesive layer may be different from or the same as each other within the range.

The manufacturing method may further include: forming a release layer on a surface opposite to a surface of the second acrylic adhesive layer on which the thermoplastic film layer is laminated. The release layer may be formed of a coating composition including a release material publicly known in the art, and the release material may include, for example, a polyester-based polymer, silicone, and the like, but is not limited thereto.

The release layer may be formed so as to have a thickness of about 50 μm to about 150 μm, but the thickness is not limited thereto.

The double-sided adhesive tape may be formed so as to have a tensile strength of about 100 MPa to about 500 MPa, and an impact strength of about 0.7 mJ to about 2.0 mJ. By forming the double-sided adhesive tape so as to have a tensile strength and an impact strength within the ranges, it is possible to effectively improve dimensional stability, and simultaneously, to maintain excellent impact resistance.

Hereinafter, specific examples of the present invention will be suggested. However, the Examples described below are only provided for specifically exemplifying or explaining the present invention, and the present invention is not limited thereby.

EXAMPLES

Example 1

A black layer having a thickness of 2 μm was formed by applying and drying a black composition, which includes 100 parts by weight of a polyurethane resin, 33.3 parts by weight of a carbon black pigment as a black colorant, 6.6 parts by weight of a dispersing agent, and 193.0 parts by weight of a solvent, on one surface of a PET film layer having a thickness of 38 μm.

Further, an acrylic polymer having a viscosity of 4,500 cP was obtained by thermally polymerizing 95 parts by weight of 2-ethylhexyl acrylate and 5 parts by weight of acrylic acid as a polar monomer in a 1-liter glass reactor, 0.2 part by weight of Irgacure-651 (α,α-methoxy-α-hydroxyacetophenone) as a photoinitiator and 0.15 part by weight of 1,6-hexanediol diacrylate (HDDA) as a photo cross-linking agent were added thereto based on 100 parts by weight of the obtained acrylic polymer, and then the resulting mixture was sufficiently stirred, and subsequently, a foaming composition was prepared by adding 0.1 part by weight of hollow microspheres (Expancel 092 DE 40 d30, AkzoNobel Corporation) having an average particle diameter of 40 μm, 0.1 part by weight of hollow microspheres (Expancel 092 DET 120 d30, AkzoNobel Corporation) having an average particle diameter of 120 μm, and 100 parts by weight of aluminum hydroxide (H-100, manufactured by Showa Denko Co., Ltd.) having an average particle of 70 μm to the mixture, and sufficiently stirring the resulting mixture until the composition became uniform.

The hollow microspheres correspond to foamed particles foamed in advance, and an acrylic foaming layer having a thickness of 0.15 mm was formed by irradiating the foaming composition with UV at a UV dose of 1,200 mJ/cm$^2$.

The black layer and the acrylic foaming layer were laminated so as to be brought into contact with each other, and then a laminate was formed by subjecting the laminated layers to a heat plywood process, and first and second acrylic adhesive layers each having a thickness of 50 μm were formed by applying and photo curing an adhesive composition including an acrylate-based resin and a photo curing agent on both surfaces of the laminate, thereby manufacturing a double-sided adhesive tape for a display.

Example 2

A Black Layer is Formed on Both Surfaces

A double-sided adhesive tape for a display was manufactured in the same conditions and manner as in Example 1, except that a black layer was formed on both surfaces of a PET film layer.

Comparative Example 1

(A thermoplastic film layer having a black layer formed is not included and a black colorant is included in an acrylic foaming layer.)

A foaming composition was prepared by further mixing 0.25 part by weight of carbon black as a black colorant with the foaming composition which is the same as that prepared in Example 1.

Subsequently, a double-sided adhesive tape for a display was manufactured by forming an acrylic foaming layer and first and second acrylic adhesive layers in the same conditions and manner as in Example 1, except that a thermoplastic film layer having a black layer formed was not included, a foaming composition with which the black colorant was further mixed was used, and the foaming composition was irradiated with UV at a UV dose of 3,000 mJ/cm$^2$.

Comparative Example 2

(A thermoplastic film layer having a black layer formed is not included and a black colorant is included in first and second acrylic adhesive layers.)

An adhesive composition was prepared by further mixing 0.25 part by weight of carbon black as a black colorant with the adhesive composition used in Example 1.

Subsequently, a double-sided adhesive tape for a display was manufactured by forming an acrylic foaming layer and first and second acrylic adhesive layers in the same conditions and manner as in Example 1, except that a thermoplastic film layer having a black layer formed was not included, and an adhesive composition with which the black colorant was further mixed was used.

Experimental Examples

Physical properties of each of the double-sided adhesive tapes for a display according to Examples 1 and 2 and Comparative Examples 1 and 2 was evaluated, and the results are shown in the following Table 1.

Evaluation Method (Tensile Strength)

Measurement Method: The tensile strength was measured by using a tensile strength measuring device (Zwick Roell Co., Ltd., Model name: 2100) in accordance with JIS K 7113 standard for each of the double-sided adhesive tapes for a display according to Examples 1 and 2 and Comparative Examples 1 and 2.

Test speed: 50 mm/min.

(Impact Strength)

Measurement Method: The impact strength was measured by using a falling ball impact tester (DuPont type impact tester) for each of the double-sided adhesive tapes for a display according to Examples 1 and 2 and Comparative Examples 1 and 2.

Specifically, a laminate sample was prepared by attaching a glass having a size of 20 mm×20 mm×3 mm to a polycarbonate (PC) base material having a size of 50 mm×mm×2 mm with a 10 mm-diameter hole formed at the center thereof through each of the double-sided adhesive tapes for a display according to Examples 1 and 2 and Comparative Examples 1 and 2.

A falling ball impact test was carried out by observing whether the glass and the double-sided adhesive tape were detached while dropping a 100-g dart at a position sequentially elevated by 50 mm at a height from 50 mm to 500 mm onto a glass surface of the laminate sample.

In this case, when the glass and the double-sided adhesive tape were not detached, the falling ball impact test was carried out while increasing the weight of the dart to 150 g, 200 g, 300 g, and 400 g until the glass and the double-sided adhesive tape were detached, and when the weight of the dart was 150 g, 200 g, and 300 g and 400 g, the dart was dropped at a position sequentially elevated by 50 mm at a height from 350 to 500 mm, 400 to 500 mm, and 350 to 500 mm, respectively.

Accordingly, for each of the double-sided adhesive tapes for a display according to Examples 1 and 2 and Comparative Examples 1 and 2, when the glass and the double-sided adhesive tape was detached, the weight of the dart and the height were measured, and an impact strength was calculated from the weight of the dart and the height.

(Adhesive Strength)

Measurement Method: For each acrylic adhesive layer included in each of the double-sided adhesive tapes for a display according to Examples 1 and 2 and Comparative Examples 1 and 2, a peel strength was measured by using a universal testing machine (UTM) (Texture Analyzer XT Plus, Stable Micro Systems Ltd.) in accordance with ASTM D 3330, and an adhesive strength was evaluated through the measurement.

Specifically, each acrylic adhesive layer was formed by photo curing each adhesive composition used in Examples 1 and 2 and Comparative Examples 1 and 2, and a peel strength for the acrylic adhesive layer was measured.

A substrate formed of a polycarbonate material with a width of 50 mm and a length of 120 mm was cleaned with a solution having isopropyl alcohol and water mixed at a volume ratio of 50:50, and then the substrate was dried. Subsequently, a polyethylene terephthalate film having a thickness of 50 μm was attached to one surface of each of the acrylic adhesive layers, a substrate formed of the polycarbonate material was attached to the other surface of each of the acrylic adhesive layers, and then each of five laminate samples was prepared by rolling a 2-kg roller back and forth twice. Further, subsequently, each sample was left to stand at room temperature for about 30 minutes, a peel strength was measured while peeling off the laminate sample from the substrate formed of the polycarbonate material under conditions of a peeling speed of 300 mm/min and a peeling angle of 180° at room temperature, and an average value thereof was evaluated as a peel strength.

TABLE 1

| | Tensile strength (MPa) | Impact strength (mJ) | Adhesive strength (g/in) | UV dose (mJ/cm$^2$) when forming an acrylic foaming layer |
|---|---|---|---|---|
| Example 1 | 201 | 0.784 | 2,800 | 1200 |
| Example 2 | 208 | 0.980 | 2,800 | 1200 |
| Comparative Example 1 | 10 | 0.662 | 2,800 | 3000 |
| Comparative Example 2 | 12 | 0.441 | 2,300 | 1200 |

As shown in Table 1, it was clearly confirmed that all of the tensile strength and the impact and shear strengths of the double-sided adhesive tapes for a display according to Examples 1 and 2 were measured at high levels, and as a result, excellent impact resistance and excellent dimensional stability could be simultaneously implemented. Furthermore, it was clearly confirmed that the efficiency of a photo curing reaction could be further improved because the acrylic adhesive layer had a small UV dose consumed when forming the acrylic foaming layer while implementing an excellent adhesive property.

In contrast, it was clearly confirmed that the tensile strengths of the double-sided adhesive tapes for a display according to Comparative Examples 1 and 2 were measured at a low level and the dimensional stabilities were inferior, and in the case of Comparative Example 1, the efficiency of the photo curing reaction was low due to the large UV dose consumed when forming the acrylic foaming layer, and in the case of Comparative Example 2, the adhesive property of the acrylic adhesive layer was low.

EXPLANATION OF REFERENCE NUMERALS AND SYMBOLS

100: Double-sided adhesive tape for display
110: Thermoplastic film layer
120: Black layer
130: Acrylic foaming layer
141: First acrylic adhesive layer
142: Second acrylic adhesive layer

The invention claimed is:

1. A double-sided adhesive tape for a display, comprising:
a first acrylic adhesive layer;
an acrylic foaming layer;
a thermoplastic film layer;
a black layer; and
a second acrylic adhesive layer,
wherein the first acrylic adhesive layer, the acrylic foaming layer, the black layer, the thermoplastic film layer and the second acrylic adhesive layer are arranged sequentially,
wherein the black layer comprises a black colorant in an amount of 10 wt % to 80 wt %,
wherein the black layer has a thickness of 0.1 μm to 5 μm,
wherein the acrylic foaming layer has an average pore size of 20 μm to 200 μm and a porosity of 1% to 40%,
wherein the acrylic foaming layer has a thickness of 30 μm to 1000 μm,
wherein each of the first acrylic adhesive layer, the acrylic foaming layer, and the second acrylic adhesive layer does not include any separate colorant,
wherein the acrylic foaming layer is formed by a photo curing reaction with UV radiation, and
wherein the double-sided adhesive tape has a tensile strength of 100 MPa to 500 MPa.

2. The double-sided adhesive tape of claim 1, wherein the black layer has a light transmittance of 4.0% or less.

3. The double-sided adhesive tape of claim 1, wherein each of the first acrylic adhesive layer and the second acrylic adhesive layer has an adhesive strength of 2,350 g/in to 4,000 g/in.

4. The double-sided adhesive tape of claim 1, wherein the acrylic foaming layer is formed by carrying out any one of UV irradiation, or sequentially carrying out both UV irradiation and heat treatment on the foaming composition, or is formed by carrying out UV irradiation on the foaming composition while injecting a gas thereto.

5. The double-sided adhesive tape of claim 4, wherein the UV irradiation is carried out at a UV dose of 500 mJ/cm$^2$ to 2,500 mJ/cm$^2$.

6. The double-sided adhesive tape of claim 4, wherein the acrylic foaming layer is formed by carrying out any one of UV irradiation, sequentially carrying out both UV irradiation and heat treatment on the foaming composition comprising an acrylic polymer and a pore-forming filler, or is formed by carrying out UV irradiation on a foaming composition, which comprises an acrylic polymer but does not comprise any pore-forming filler, while injecting a gas thereto, the pore-forming filler is comprised in an amount of 0.1 part by weight to 10 parts by weight based on 100 parts by weight of the acrylic polymer, and the gas is injected at a flow rate of 0.001 cubic feet per minute (CFM) to 0.05 CFM.

7. The double-sided adhesive tape of claim 6, wherein the acrylic polymer is formed by polymerizing a co-polymerizable monomer component comprising an alkyl (meth) acrylate-based monomer and a polar functional group-containing monomer, and a weight ratio of the alkyl (meth) acrylate-based monomer to the polar functional group-containing monomer, which form the acrylic polymer, is 9:1 to 7:3.

8. The double-sided adhesive tape of claim 1, further comprising: a release layer on a surface opposite to a surface of the second acrylic adhesive layer on which the thermoplastic film layer is laminated.

9. A method for manufacturing the double-sided adhesive tape for a display of claim 1, the method comprising:

forming a black layer on at least one surface of a thermoplastic film layer;

forming an acrylic foaming layer;

forming a laminate by laminating the thermoplastic film layer having the black layer formed on at least one surface thereof and the acrylic foaming layer; and manufacturing a double-sided adhesive tape for a display by forming acrylic adhesive layers on both surfaces of the laminate, and wherein in the forming of the black layer, the black layer is formed so as to comprise a black colorant in an amount of 10 wt % to 80 wt % and to have a thickness of 0.1 μm to 5 μm.

10. The method of claim 9, wherein in the forming of the black layer, the black layer is formed so as to have a light transmittance of 4.0% or less.

11. The method of claim 9, wherein in the forming of the acrylic foaming layer, the acrylic foaming layer is formed by carrying out any one of UV irradiation and heat treatment, or sequentially carrying out both UV irradiation and heat treatment on a foaming composition; or is formed by carrying out UV irradiation on the foaming composition while injecting a gas thereto.

12. The method of claim 11, wherein in the forming of the acrylic foaming layer, the UV irradiation is carried out at a UV dose of 500 mJ/cm$^2$ to 2,500 mJ/cm$^2$.

13. The method of claim 9, wherein the acrylic foaming layer is formed by carrying out any one of UV irradiation and heat treatment, or sequentially carrying out both UV irradiation and heat treatment on a foaming composition comprising an acrylic polymer and a pore-forming filler; or is formed by carrying out UV irradiation on a foaming composition, which comprises an acrylic polymer but does not comprise any pore-forming filler, while injecting a gas thereto, the pore-forming filler is comprised in an amount of 0.1 part by weight to 10 parts by weight based on 100 parts by weight of the acrylic polymer, and the gas is injected at a flow rate of 0.001 cubic feet per minute (CFM) to 0.05 CFM.

* * * * *